United States Patent [19]

Baldwin et al.

[11] Patent Number: 4,629,879

[45] Date of Patent: Dec. 16, 1986

[54] LIGHT BEAM INTENSITY CONTROLLING APPARATUS

[75] Inventors: Roger E. Baldwin, Hilton; Nea-Yea Woo, Rochester, both of N.Y.

[73] Assignee: Eastman Kodak Company, Rochester, N.Y.

[21] Appl. No.: 619,453

[22] Filed: Jun. 11, 1984

[51] Int. Cl.$^4$ .......................... G01J 1/32; G01R 27/02
[52] U.S. Cl. ................................. 250/205; 324/77 K
[58] Field of Search .................... 250/205, 214 AG; 356/400; 324/77 K

[56] References Cited

U.S. PATENT DOCUMENTS

| 3,895,317 | 7/1975 | Burton . | |
| 4,051,329 | 9/1977 | Blondet et al. | 179/100 |
| 4,180,822 | 12/1979 | Hudson et al. | 346/108 |
| 4,272,825 | 6/1981 | Smithline et al. | 364/571 |
| 4,308,544 | 12/1981 | Lucero et al. | 346/108 |
| 4,503,388 | 3/1985 | Zehl et al. | 324/77 K |

Primary Examiner—Gene Wan
Attorney, Agent, or Firm—Donald S. Schaper

[57] ABSTRACT

Beam intensity controlling device includes an acoustooptic cell which receives an input light beam and produces an undiffracted or zero-order light beam and a diffracted beam in response to an RF signal at a predetermined frequency. An error signal is produced which is a function of the differences in the intensity of the zero-order beam from a desired level. This error signal is used to control the amplitude of the RF signal which in turn changes the intensity in the diffracted and zero-order beams such that the zero-order beam intensity is maintained relatively constant and can be provided as an input to a modulating device. The error signal has two components, a DC component which corrects for slow drift of the zero-order light beam intensity and an AC component which corrects for higher frequency changes in the zero-order light beam intensity.

4 Claims, 3 Drawing Figures

FIG. 2
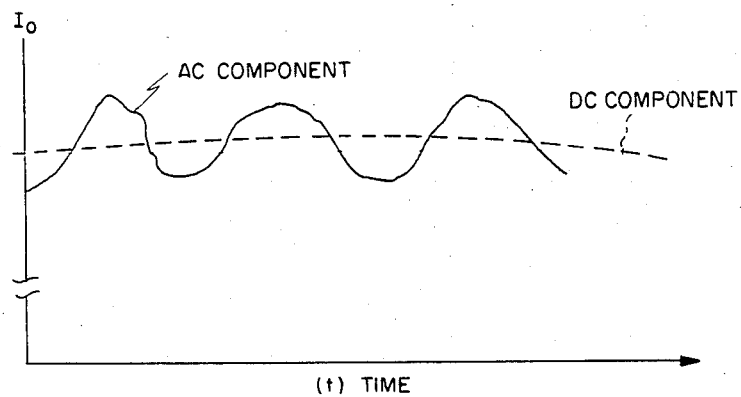
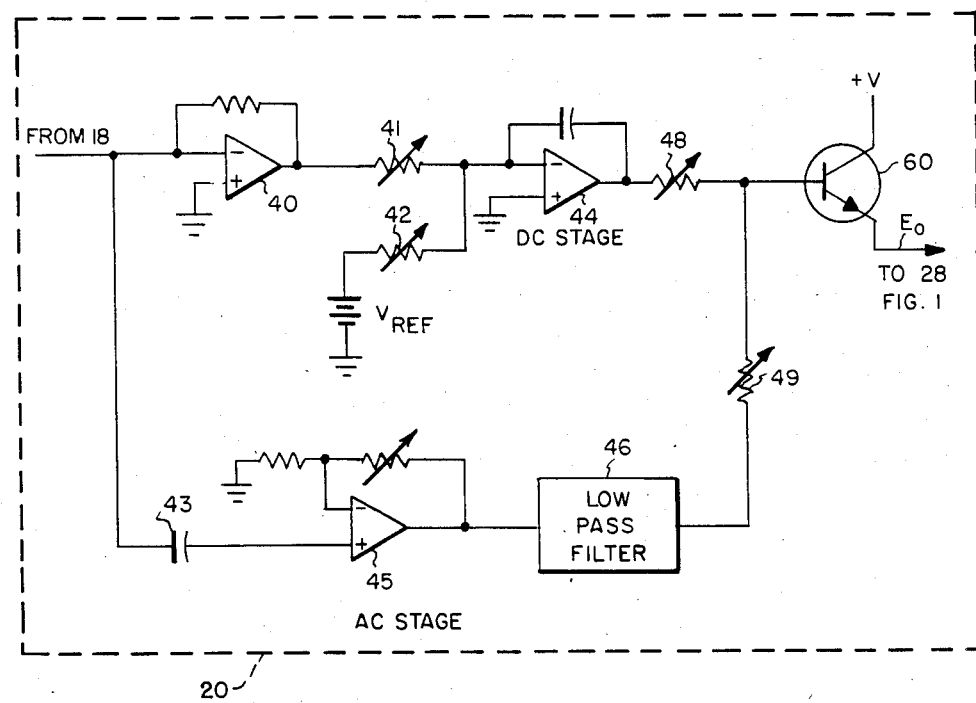
FIG. 3

LIGHT BEAM INTENSITY CONTROLLING APPARATUS

FIELD OF THE INVENTION

This invention relates to apparatus for producing a substantially constant intensity light beam which can be applied as an input to a utilization device such as the modulating device of an output scanner.

BACKGROUND OF THE INVENTION

In many optical printing systems the intensity of a light beam focused on a two-dimensional photosensitive surface is modulated as the beam is moved relative to such surface to provide a two-dimensional output image. Such systems often use an output scanner which may include a gas laser which produces a beam of light at a predetermined wavelength and a deflector such as a rotating polygon mirror which line scans this light beam. The intensity of this laser light beam is modulated by an acoustooptic modulator.

This type of modulator includes a transparent cell which may be made of an acoustooptic material such as glass or $TeO_2$ crystal and a piezoelectric transducer bonded to the cell. An RF signal, usually in the range of 40–300 MHz, is applied to the transducer. The transducer launches acoustic waves in the cell which produces sonic compression waves that create a diffraction wave grating. This diffraction grating causes a portion of the input laser light beam passing through the cell to be diffracted out of its original path. Amplitude changes of the RF signal cause intensity modulation of the diffracted (first-order) and undiffracted (zero-order) beams. The intensity of the modulated diffracted light beam varies in direct proportion to RF signal amplitude. The modulated diffracted light beam, rather than the undiffracted beam, is utilized, e.g. applied to a deflector which converts the modulated light beam into a line scan.

In some printing applications it is highly desirable that the intensity of the input laser light beam applied to the acoustooptic modulator be kept relatively constant. For example, in certain applications it is desirable that noise, which is variations in such input light beam intensity about a desired constant intensity level, be kept on a very low level such as in the order of less than about 0.1% peak-to-peak intensity of the desired constant intensity level. Controlling the noise, prevents density banding in prints made by the output scanner.

Electrooptic devices such as Pockels devices are used to reduce such noise. A Pockels device includes a polarizer which polarizes a beam of unmodulated laser light and a Pockels cell having spaced transparent electrodes on its end surfaces and an adjustable voltage source for applying a voltage across such electrodes. The voltage establishes an electric field longitudinally along the light transmission path in the cell. A change in voltage, which is proportional to the noise in the input laser beam, causes a change in the electric field. The electric field changes the polarization (azimuth) of the light beam directly as a function of the applied voltage but does not change beam intensity. An analyzer disposed after the Pockels cell converts the polarization changes into light beam intensity changes causing the intensity of the light beam at the output of the analyzer to be at a desired constant intensity level. Such Pockels devices have a disadvantage in that effective transparent electrodes are difficult to make since ideally they should absorb little light but still be sufficiently conductive to apply a uniform field. Also, Pockels cells are often subject to thermal drift.

SUMMARY OF THE INVENTION

The object of this invention is to provide beam intensity controlling apparatus which does not use a Pockels cell and which receives an input laser light beam having variations in its intensity (noise) and produces a substantially constant intensity output beam which can be applied as an input to a utilization device such as an acoustooptic modulator of an output scanner.

This object is achieved by beam intensity controlling apparatus which includes an acoustooptic cell which receives a noisy intensity input laser light beam and produces a zero-order beam and a first-order light beam in response to an input RF signal at a predetermined frequency. Means responsive to the intensity of the zero-order beam produce an error signal which is a function of the difference in intensity of the zero-order beam from a desired constant intensity level. This error signal is provided to adjustable means which cause a change in the amplitude of the RF signal which changes the intensities of the zero-order and first-order beams so that the zero-order beam is at the desired constant intensity. The zero-order beam is then applied as an input to a utilization device.

The adjustable means is adapted to respond to an error signal having two components, a DC component which represents slow shift changes in the zero-order beam intensity and an AC component which represents faster time varying changes in the zero-order beam intensity.

An advantage of using the zero-order beam produced by an acoustooptic cell is that it permits highly efficient throughput of laser energy since only a small amount of laser power needs to be diverted to the first-order beam. Acoustooptic cells are inexpensive, and do not require high voltages. Also, they are not subject to the high levels of thermal drift usually found in Pockels cell devices.

BRIEF DESCRIPTION OF THE DRAWINGS

FIG. 2 is a graph of the intensity of the a light beam delivered to the apparatus of FIG. 1, showing that such beam may be considered to be made up of AC and DC components; and FIG. 3 is a detailed schematic diagram of portions of the circuit 20 of FIG. 1.

DESCRIPTION OF THE PREFERRED EMBODIMENTS

Figure 1:
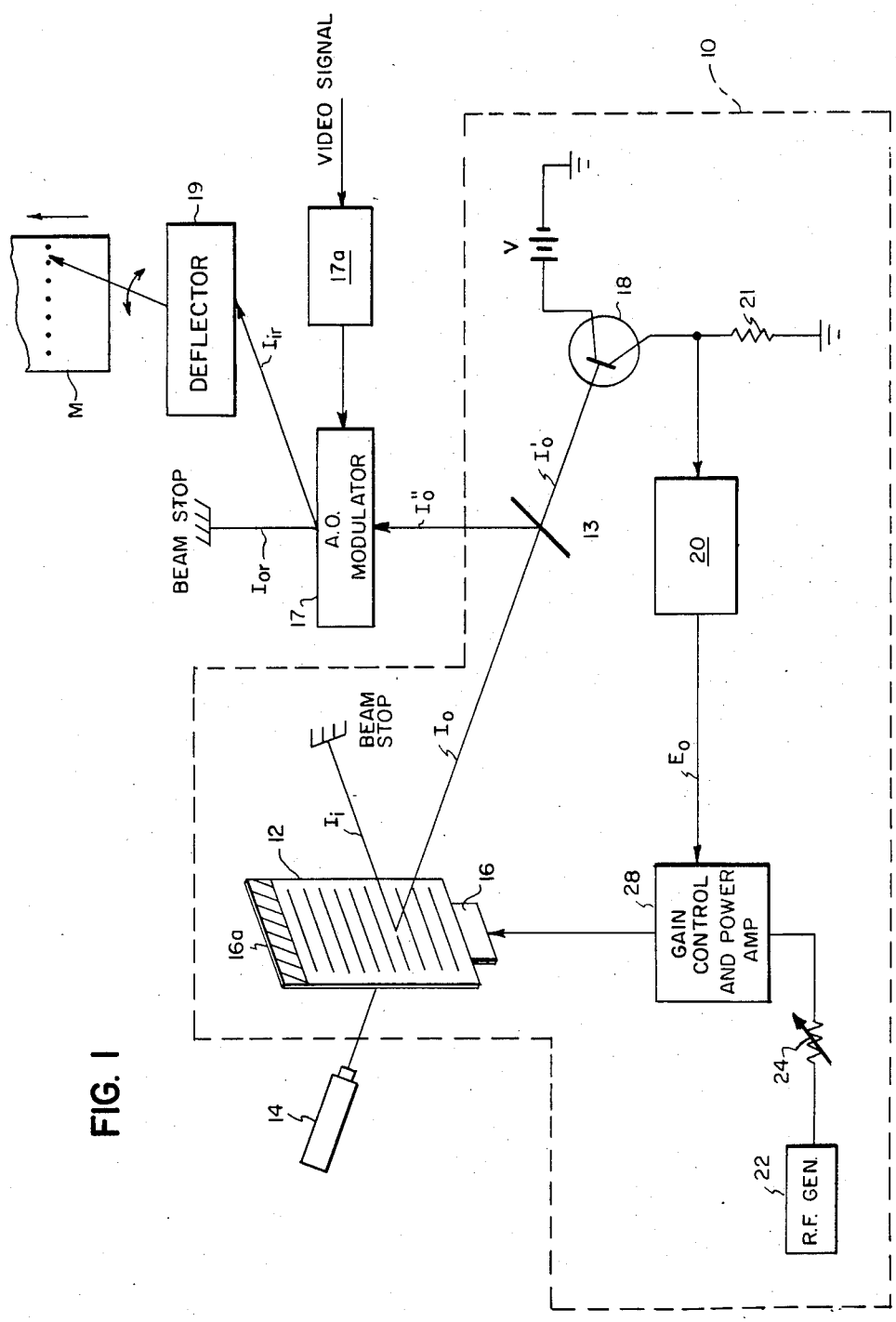
FIG. 1 shows a diagram, partially in block and partially in schematic form of beam intensity controlling apparatus coupled to an output scanner in accordance with the invention.

In FIG. 1, beam controlling apparatus 10, in accord with the present invention, is shown to include a conventional acoustooptic cell 12. The apparatus 10 receives a beam of noisy laser light (see FIG. 2) at a predetermined wavelength from a laser 14. The apparatus 10 reduces the noise or intensity variations in the light beam produced by the laser 14 and delivers a zero-order beam $I_o''$ at a desired intensity to an output scanner, which includes an acoustooptic modulator 17 and a deflector 19. It should be noted that the modulator 17 delivers a modulated first-order beam $I_{ir}$ to the deflector 19.

The acoustooptic cell 12 includes a transparent member formed for example from glass or $TeO_2$ crystal and a piezoelectric transducer 16 bonded to the cell. Control apparatus 10 also includes RF generator 22 which provides an electrical signal of a predetermined frequency to the transducer 16, which translates the RF electrical signal into acoustic waves that propagate through the acoustooptic cell. Also bonded to the cell 12 is a conventional acoustic absorber 16a. The acoustic waves launched within the cell correspond to the predetermined frequency of the RF signal and form a phase diffraction grating causing a first-order light beam $I_i$ which passes through the cell to be diffracted out of the zero-order beam $I_o$ to a beam stop.

As will be shortly described, the zero-order beam $I_o$ is sampled to determine intensity variations in the zero-order beam from a desired constant intensity level and the amplitude of the RF signal applied to transducer 16 is adjusted to change the intensity of the zero-order beam toward the desired level. The zero-order beam $I_o$ is divided by a beam splitter 13 into two zero-order beams $I_o'$ and $I_o''$. The beam $I_o'$ is a small sample of the zero-order beam $I_o$ and will be used to produce an error signal for controlling the intensity of the zero-order beam $I_o''$. The beam $I_o''$ is delivered by the apparatus 10 as an input to the modulator 17 of an output scanner which will now be briefly discussed.

The modulator 17 is a conventional single-beam acoustooptic modulator. A video signal drives a gain control and power amplifier 17a which provides a control signal to the modulator 17 which modulates the diffracted beam $I_{ir}$ in accordance with the video signal.

The modulator 17 produces a diffracted beam $I_{ir}$ and an undiffracted (zero-order beam) $I_{or}$. The deflector 19, which may be a rotating polygon mirror, converts the modulated stationary light beam $I_{ir}$ to a line scan which is recorded on a moving medium M. The zero-order beam $I_{or}$ is applied to a beam stop and is not used for recording. The operation of the modulator 17 and deflectors 19 used in output scanners are well understood in the art. For a more complete description of modulators and deflectors, see Urbach et al, "Laser Scanning for Electronic Printing", *Proceeding of the IEEE*, 597 (June 1982).

As noted above, the beam splitter 13 divides the zero-order beam $I_o$ into two zero-order beams, $I_o'$ and $I_o''$. Beam $I_o'$ is detected by a photocell 18. Photocell 18 is shown as being biased by a battery V. The current produced by the photocell 18 is proportional to the intensity of each of the zero-order beams $I_o$, $I_o'$ and $I_o''$. Variations in the intensity of beam $I_o'$ cause fluctuations in this current which in turn causes a varying voltage signal between the photocell 18 and resistor 21. This voltage signal is applied to error signal producing circuit 20 and is representative of the intensity of the zero-order beam $I_o''$. The RF generator 22 which may be a conventional device well understood in the art, produces an electrical signal having a fixed frequency at a predetermined amplitude. The amplitude of this signal is controlled by a network which is shown only as a resistor 24 for simplicity of illustration. The RF signal is actually impressed upon the transducer 16 through a circuit 28 which includes gain control and power amplifier portions. The circuit 28 receives an error signal $E_o$ from circuit 20. In response to the error signal, the circuit 28 adjusts the amplitude of the RF signal applied to the transducer 16 so that the beam portion $I_o''$ is maintained at a desired constant intensity level. The acoustic wavelength of the compression wave launched within the cell 12 corresponds to the fixed frequency electrical signal produced by the RF generator. This causes a diffraction grating which produces the first-order beam $I_i$ with an intensity directly proportional to the amplitude of the RF signal. The acoustic wavelength (A) can be calculated from the following expression $$\Lambda = \frac{v_s}{f_s} \tag{1}$$

wherein $v_s$ is the acoustic velocity in cell 12 and $f_s$ is the RF frequency.

Diffraction in the acoustooptic cell 12 is explained by Robert Alder in an article in the *IEEE Spectrum*, May 1967, pp. 42–55 entitled "Interaction of Light and Sound". The transducer 16 can be designed to have a 50-ohm impedance. The RF electrical signal in the range of 40–300 MHz is applied to the transducer. The transducer launches acoustic waves which produce a defraction grating. The amplitude of the RF signal is adjusted by the gain control circuit 28. Peak-to-peak voltages of the RF signal applied to the transducer 16 are in a range of about 2–3 volts. The error signal $E_o$ produced by circuit 20 is used to adjust the gain control portion of circuit 28 which amplitude modulates the RF signal to give rise to intensity changes in the zero and first-order beams.

Turning now to FIG. 2, we see a graphical representation of variations in the intensity of light beam applied to the apparatus 10 as a function of time. The intensity of this beam can be considered to have two components, a DC component shown as a dotted line which follows the slow drift of changes of the beam intensity and an AC component which is the frequency variations of the beam intensity. The delay time of cell 12 limits the high frequencies over which corrections due to changes in the AC component can be made. The delay time of the cell 12 results from the propagation time of an acoustic wave within the cell 12 to the beam position within the cell. A typical delay time in a $TeO_2$ crystal with a beam located $300\mu$ from the transducer 16 would result in about 0.07 microseconds delay. Typically, intensity variations at AC component frequencies over about 1 MHz cannot be corrected.

As shown in FIG. 3, the error signal producing circuit 20 actually consists of two separate stages, a DC stage and an AC stage. The DC stage produces one signal component of the error signal corresponding to differences between the DC beam intensity component and a desired constant intensity and the AC stage produces a signal component of the error signal for minimizing the AC beam intensity component. A voltage signal produced at the junction of photocell 18 and resistor 21 is applied as an input to the circuit 20. This voltage signal includes DC and AC voltage components which represent their corresponding intensity components in beam $I_o''$. The DC voltage component has low frequency constituents and the AC voltage component has higher frequency constituents. The DC stage is adapted to use the DC voltage component to adjust the level of a reference voltage provided by a battery $V_{REF}$ and feedback a component of the error signal $E_o$ to the gain control and power amplifier 28 in order to maintain the average intensity of the zero-order beam $I_o''$ at a desired intensity level. The DC stage corrects for slow drifts of the laser power while the AC stage minimizes higher frequency changes. The AC stage preferably has 40 db gain at low frequency up to about 10 KHz. When the frequency increases above about 10 KHz, the gain decreases at 20 db per decade to 0 db at about 1 MHz. Because of the delay time in acoustic wave propagation, correction cannot be made for high frequency changes (greater than 1 MHz) in the intensity of beam $I_o''$.

As shown in FIG. 3, the DC stage of circuit 20 includes an inverter 40. The output signal of inverter 40 is applied through an adjustable resistor 41 to the inverting input of an operational amplifier of an integrator 44. A reference voltage from battery $V_{REF}$ is applied through adjustable resistor 42, to the non-inverting input of the operational amplifier. By adjusting the resistance of the resistors 41 and 42, a desired constant beam intensity level can be selected. The integrator 44 produces an output signal which represents the inverse of the difference in the DC intensity component from the desired intensity level. The frequency response of the integrator 44 can be adjusted by changing its capacitor and/or input resistance. The output signal of integrator 44 is applied to a summing resistor 48.

The AC stage of circuit 20 includes a coupling capacitor 43 which permits only the AC component of the voltage signal to be delivered to the noninverting input of a variable gain amplifier 45 which also inverts the AC component signal. A low pass filter 46 receives the output of the amplifier 45. For frequency constituents above 10 KHz, the filter gain gradually decreases until about 1 MHz it is about 0 db. The output signal of filter 46 is applied to a summing resistor 49. The summing resistors 48 and 49 combine both AC and DC components and apply them to an output buffer amplifier 60. Amplifier 60 produces the error signal $E_o$ which is feed back to the gain control portion of circuit 28. Circuit 28 adjusts the amplitude of the RF signal to thereby change the intensity of the zero-order beam $I_o''$ toward the desired constant intensity level.

The invention has been described in detail with particular reference to a preferred embodiment thereof, but it will be understood that variations and modifications can be effected within the spirit and scope of the invention.

We claim:

1. Beam intensity controlling apparatus for producing a relatively constant intensity light beam which may be applied as an input to a utilization device, comprising:
   (a) an acoustooptic cell for receiving an input light beam and producing a zero-order beam and a diffracted light beam in response to an input RF signal, changes in the amplitude of said RF signal causing intensity changes in the diffracted and zero-order beams;
   (b) means for producing an error signal which is a function of the high-frequency variations and the low-frequency variations of the zero-order beam from a desired constant intensity level; and
   (c) adjustable means being responsive to said error signal for controlling the amplitude of said RF signal to change the intensity of the zero-order beam toward said desired constant intensity level.

2. Beam intensity controlling apparatus for producing a relatively constant intensity light beam which may be applied as an input to a utilization device, comprising:
   (a) adjustable means for producing an RF signal at a fixed frequency and generally predetermined amplitude and which in response to an error signal changes the amplitude of such RF signal;
   (b) an acoustooptic cell for receiving an input light beam and producing a zero-order beam and a diffracted light beam in response to said input RF signal, changes in the amplitude of said RF signal causing intensity changes in the diffracted and zero-order beams;
   (c) means responsive to the intensity of the zero-order beam for producing an error signal which is a function of the difference in intensity of the zero-order beam from a desired constant intensity level, said error signal producing means including
      (i) means for producing a DC error component which represents slow changes in the intensity of the zero-order beam;
      (ii) means for producing an AC error component which represents faster changes in the intensity of the zero-order beam; and
      (iii) means for combining said AC and DC error components to produce said error signal; and
   (d) said adjustable means being responsive to said error signal for controlling the amplitude of said RF signal to change the intensity of the zero-order beam toward said desired constant intensity level.

3. In combination with a scanner having a modulating device, beam intensity controlling apparatus for producing a relatively constant intensity light beam which is applied as an input to the modulating device, said apparatus comprising:
   (a) adjustable means for producing an RF signal at a fixed frequency and predetermined amplitude and which in response to an error signal changes the amplitude of such RF signal;
   (b) an acoustooptic cell for receiving an input light beam and producing a zero-order beam and a diffracted light beam in response to an RF signal, said cell being responsive to changes in the amplitude of such RF signal by causing intensity changes in the diffracted and zero-order beams;
   (c) means for dividing the zero-order beam into first and second zero-order beams, said first zero-order beam being delivered to the modulating device;
   (d) error signal producing means responsive to the intensity of said second zero-order beam for producing an error signal which is a function of the difference in intensity of said first zero-order beam from a desired constant intensity level; and
   (e) said adjustable means being responsive to said error signal for controlling the amplitude of such RF signal to change the intensity of said first zero-order beam toward said desired constant intensity level.

4. The invention as set forth in claim 3, wherein said error signal producing means includes
   (i) means for producing a DC component which represents slow changes in the intensity of said first zero-order beam;
   (ii) means for producing an AC component which represents faster changes in said first zero-order beam; and
   (iii) means for combining said AC and DC components to produce said error signal.

* * * * *